No. 720,936. PATENTED FEB. 17, 1903.
F. A. LAW.
STEERING MECHANISM FOR VEHICLES.
APPLICATION FILED MAY 16, 1902.
NO MODEL. 2 SHEETS—SHEET 1.
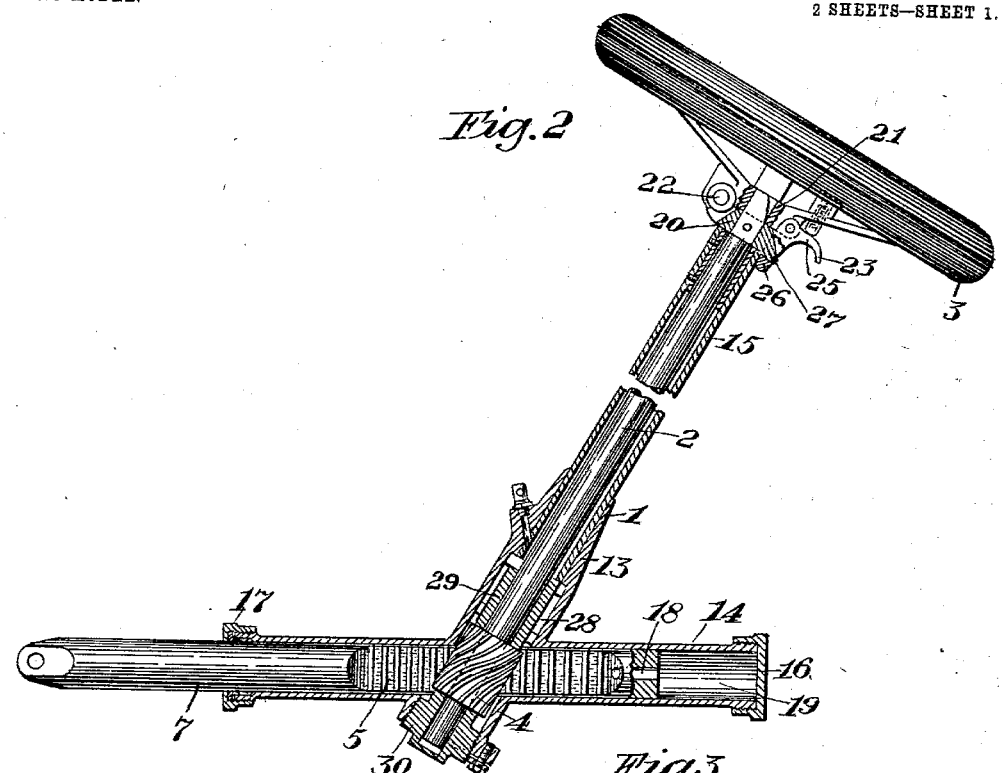
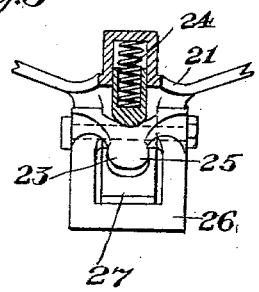
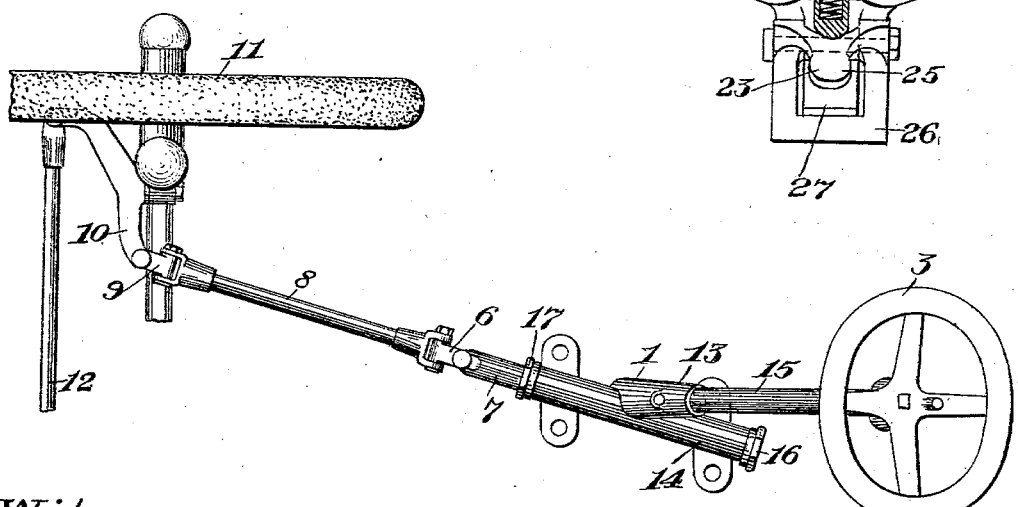
Witnesses:
Geo. B. Rowley.
Emma P. Coffin
Inventor,
Fred A. Law
By Jenkins & Barker
Attorneys No. 720,936. PATENTED FEB. 17, 1903.
F. A. LAW.
STEERING MECHANISM FOR VEHICLES.
APPLICATION FILED MAY 16, 1902.
NO MODEL. 2 SHEETS—SHEET 2.

Witnesses:
Geo. B. Rowley.
Emma P. Coffin.

Inventor:
Fred A. Law
By Jenkins & Barker
Attorneys

UNITED STATES PATENT OFFICE.

FRED A. LAW, OF HARTFORD, CONNECTICUT, ASSIGNOR TO ELECTRIC VEHICLE COMPANY, OF JERSEY CITY, NEW JERSEY, A CORPORATION OF NEW JERSEY.

STEERING MECHANISM FOR VEHICLES.

SPECIFICATION forming part of Letters Patent No. 720,936, dated February 17, 1903.

Application filed May 16, 1902. Serial No. 107,608. (No model.)

*To all whom it may concern:*

Be it known that I, FRED A. LAW, a citizen of the United States, and a resident of Hartford, in the county of Hartford and State of Connecticut, have invented certain new and useful Improvements in Steering Mechanism for Vehicles, of which the following is a specification.

My invention relates to a mechanism for controlling the direction of movement of a vehicle which is guided by the occupant, and, as shown in the accompanying drawings, pertains to a steering mechanism combined with individually-pivoted steering-wheels.

The objects of the invention are to provide a steering mechanism which may be conveniently located with respect to the occupant and may be so disposed at times as to permit free ingress to and egress from the vehicle.

A further object of the invention is to provide two coöperating members which will transmit proper motion from the hand wheel or lever to the steering-wheels without transmitting shocks and jars of said wheels to the hand wheel or lever.

A still further object is to place all the several operative parts in a self-contained casing and in such relation to each other that the friction between the parts will be minimized and all may be immersed and run in a bath of oil.

Figure 5:
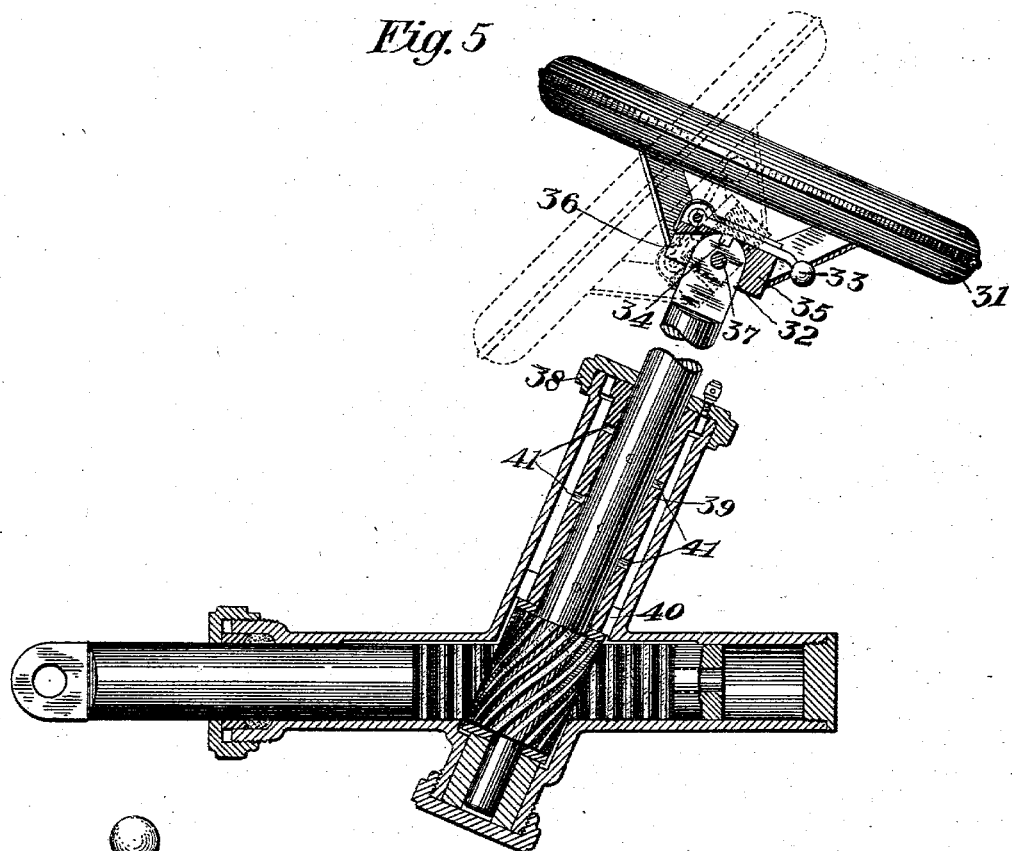
Figure 4:
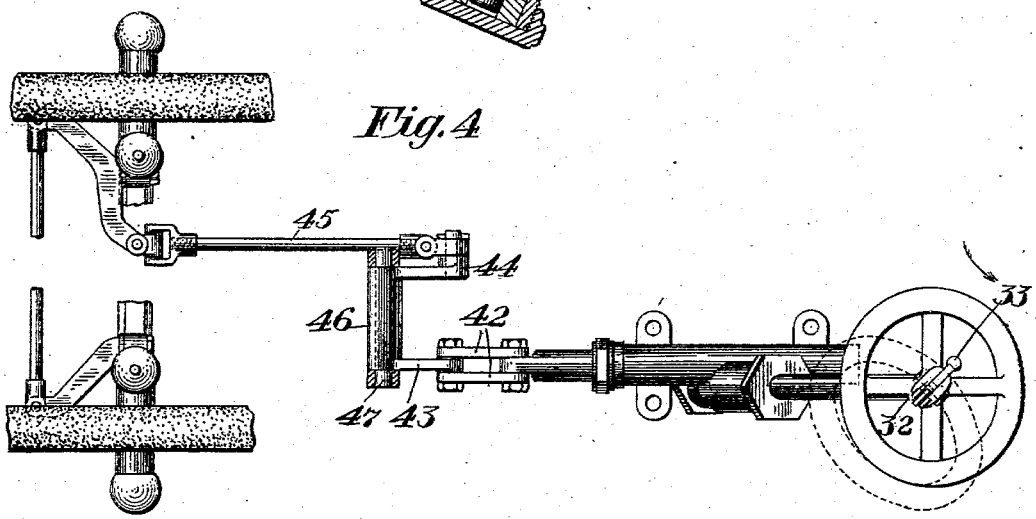

Referring to the drawings, Figure 1 is a detail plan view of the hand controlling-wheel and parts intermediate said wheel and the steering-wheels of the vehicle. Fig. 2 is a detail sectional view through the steering mechanism. Fig. 3 is a detail view of the lock appurtenant to the hand-wheel. Fig. 4 is a plan view showing a modified form of the device. Fig. 5 is a sectional view, on enlarged scale, through the steering-pillar and appurtenant parts.

In the accompanying drawings, 1 denotes the steering-pillar, which supports the steering-shaft 2, bearing at its upper end a hand-wheel 3 and at its opposite end a worm or spiral gear 4. This spiral gear meshes with a rack 5, and obviously the rotation of the wheel 3 will cause a reciprocation of the rack 5. A double-pivot connector 6 unites one end of the bar 7 upon which the rack is cut with a steering-link 8, which in turn through a similar connection 9 is joined with the steering-arm 10 of the steering-wheel 11. The two wheels are individually pivoted and connected by a transverse pivot-bar 12, which gives the proper relative turning movement to each of the wheels.

The steering-pillar consists of a casing having two branches 13 14, which join each other and form a continuous chamber. Into the upper end of the part 13 is secured a tube 15, which forms a support for the upper end of the steering rod or shaft 2. The branch 14 is bored to receive the cylindrical rod 7 and is provided at one end with a cap 16 and at the opposite end with a stuffing-box 17. The rack-teeth are cut upon this rod, and an opening is provided, as at 18, to permit oil to pass from the chamber 19 over the teeth of the rack when the bar 7 is drawn backward.

The upper end of the shaft 2 is squared and to it is secured a hinge-block 20, and the hub 21 of the steering-wheel is also squared to fit upon the upper end of the steering-shaft. This hub is pivoted to the hinge-block by a hinge 22 and is normally locked in the position shown in Figs. 1 and 2 by a trigger 23, which is normally depressed by a spring 24, carried in a suitable spring-box secured to one of the arms or spokes of the wheel. This trigger comprises an operating finger-piece 25 and a locking-loop 26, which fits over a lug 27, formed integral with the hinge-block 20. The interengaging surfaces of this lug and the member 26 are formed on the radius struck from the pivot of the trigger 23. From this arrangement it will be seen that the wheel when in position rests upon the squared end of the steering-shaft and is directly locked thereto until the trigger 23 has been moved to a sufficient degree to disengage the bar 26 from the lug 27. When so disengaged, the wheel may be tilted upon the pivot 22 until it lies in a plane substantially parallel with the axis of the steering-shaft.

Within the branch 13 there is a recess 28, forming a suitable oil-chamber, and a bushing 29, provided with oil-grooves, serves to maintain the proper alinement of the shaft 2. At the end of the steering-shaft is an adjusting-cap 30, which serves as a step-bearing for the spiral gear 4 and may be removed to withdraw the oil from the entire structure.

It is apparent that with the mechanism herein shown all the parts may be immersed in a bath of oil and that there can be little or no leakage or drip of oil from the structure, inasmuch as all of the parts are contained in the same casing, which is securely closed at all the joints with stuffing-boxes.

In Figs. 1 and 2 the connections from the rack 5 to the arm of the steering-wheel are in a direct line and arranged substantially on the same axis, and there are certain advantages in such an arrangement, as all thrusts and strains must be direct.

In Figs. 4 and 5 of the drawings there is shown a slightly-modified form of the device, and in this case, as in the one above described, all of the parts are arranged within a single casing; but the hand-wheel 31 is mounted upon the end of the steering-shaft through the medium of a knuckle-joint 32, and a short lever 33, provided with a locking-lug 34, holds the parts in the position shown in full outline. The hub 35 is cut away, as at 36, and thus permits a swinging movement of the hand-wheel upon its pivot 37. In this form of the device also there is no tube surrounding the steering-shaft and having a bearing and support therefor; but the casing is provided with a cap 38, which prevents leakage of oil. Within the shaft-supporting casing is a bushing 39, provided with oil-grooves 40 41, which permit the free passage of a lubricant to the intermeshing spiral gear and rack. In this form of the device the connections between the rack-bar and the arm of the steering-wheel are made through links 42 and arms 43 44, the latter connected with the steering-rod 45. The two arms 43 44 are mounted upon or secured to a sleeve 46, which is mounted upon a pivot 47.

Obviously numerous changes might be made in the details of the mechanism which are herein fully described and shown without departing from the spirit of the invention, which contemplates the use of a rack-bar and spiral gear, the latter controlled by a hand wheel or lever, which arrangement gives a direct-acting steering-gear and permits incasing all of the parts in a single casing, excluding all dirt from the wearing parts, and running the several parts of the mechanism in a bath of oil without liability of drip.

What I claim as my invention, and desire to secure by Letters Patent, is—

1. In a steering-gear for vehicles, a steering-pillar comprising a casing branching in two directions, a steering-shaft arranged in one of said branches, a steering-rack arranged in the other and entirely inclosed thereby, a plain extension on said rack member protruding through said casing and an oil-tight aperture therefor, and means for rotating the steering-shaft.

2. In a steering-gear, in combination, a steering-pillar consisting of a casing having two integral branches, one of said branches forming a bearing for a steering-rack and its coöperating skew-gear and completely inclosing the interengaging toothed or threaded parts in all positions of operation, the other branch forming a supporting-bearing for a steering-shaft, and means for rotating said shaft.

3. In a steering-gear, in combination, a casing comprising two integral and angularly-disposed branches, one forming an air-tight casing and a bearing for a reciprocating member, the other providing a bearing for a rotary member, a spiral gear borne upon said rotary member and adapted to mesh with and control the movements of the reciprocating member, and means for rotating said rotary member.

4. In a steering-gear for motor-vehicles, a rack and pinion, a rotary steering-shaft, means for rotating the same, connections from the rack member to steering-wheels, a casing supporting said rack member and pinion and entirely inclosing said rack, and an oil-tight aperture for said rack member, substantially as and for the purpose described.

5. In a steering-gear for motor-vehicles, a rotary steering-shaft and means for rotating the same, a skew-pinion on the lower end of said shaft, an interengaging reciprocating member, a rack on said reciprocating member, a support and casing for the base of said rotating steering-shaft and reciprocating member including two integral angularly-disposed branches, an oil-tight packing inclosing the aperture through which the rack-carrying member reciprocates, for the purpose described.

6. In a steering-gear, a rotary steering-shaft, a reciprocating rack-carrying member and a pinion, a single integral casing supporting and incasing said reciprocating member and the lower end of said rotary shaft and completely incasing said rack, a thrust-bearing within said casing for engagement with said pinion, and means of adjustment for said pinion or bearing.

7. In combination in a steering mechanism, a supporting-pillar, a steering-shaft mounted therein, a hand-wheel adapted to rotate said steering-shaft and secured by a pivotal connection to a block longitudinally immovable on said steering-shaft, said steering-shaft and block embodying means permitting tilting said steering-wheel out of its normal plane of operation, and a trigger for locking said wheel in position upon the steering-shaft.

8. The combination in a steering mechanism of a steering-shaft, a support or base therefor, a hand-wheel adapted to rotate said shaft, and longitudinally immovably secured thereto and having a single movement in another direction relative to said shaft accommodated thereby, a pivotal connection for said hand-wheel, and means for locking said hand-wheel in normal position for rotation of said shaft.

9. In combination in a steering mechanism for a motor-vehicle, a rotating steering-shaft, a steering hand-wheel, connections from the lower end of said shaft for deflecting the steering road-wheels, a fixed hinge-block attached to the upper end of said shaft extending on either side thereof, a hinged or pivotal connection between said hand-wheel and block on one side of said shaft and readily-detachable securing means between said wheel and block on another side of said shaft.

10. In a steering-gear, in combination, an inclosing casing providing bearings for a reciprocating member and a rotary member, means for adjusting said rotary member relatively to the reciprocating member, a steering-wheel mounted upon and adapted to rotate said rotary member and having a movement independent thereof, and means for locking and unlocking said steering-wheel and rotary member.

11. In combination in a steering-gear, a steering-pillar including a casing having two members angularly disposed, a reciprocating rack member mounted in one of said branches, a plain portion of said rack member reciprocating through an aperture in said casing, a stuffing-box inclosing said aperture, and a controlling-shaft member mounted in the other, a spiral gear interposed between the shaft and the reciprocating rack and direct connections between said rack and the arm of a steering-wheel.

FRED A. LAW.

Witnesses:
E. P. COFFRIN,
WM. H. BARKER.